United States Patent [19]
Abe et al.

[11] Patent Number: 6,081,374
[45] Date of Patent: Jun. 27, 2000

[54] BRANCH IMAGE PICKUP AND VIEW SYSTEM

[75] Inventors: Tetsuya Abe, Hokkaido; Takayuki Ito, Tokyo; Takaaki Yano, Hokkaido, all of Japan

[73] Assignee: Asahi Kogaku Kogyo Kabushiki Kaisha, Tokyo, Japan

[21] Appl. No.: 08/869,212

[22] Filed: Jun. 4, 1997

[30] Foreign Application Priority Data

Jun. 6, 1996 [JP] Japan ................................ 8-144491

[51] Int. Cl.[7] .................................................. G02B 23/00
[52] U.S. Cl. .......................... 359/431; 359/362; 359/434; 348/335
[58] Field of Search .......................... 359/362, 420–422, 359/431–433, 831–837; 348/335, 340–344; 396/373–386

[56] References Cited

U.S. PATENT DOCUMENTS

| | | |
|---|---|---|
| 4,525,744 | 6/1985 | Nakamura et al. ...................... 348/341 |
| 4,730,199 | 3/1988 | Ikemori et al. .......................... 396/384 |
| 4,839,314 | 6/1989 | Boudot et al. ............................. 501/78 |
| 4,953,029 | 8/1990 | Morimoto et al. ...................... 358/229 |
| 4,992,809 | 2/1991 | Nozaki et al. .......................... 396/386 |
| 5,231,534 | 7/1993 | Kato ....................................... 359/432 |
| 5,848,308 | 12/1998 | Kawamura ............................... 348/341 |

*Primary Examiner*—Thong Nguyen
*Attorney, Agent, or Firm*—Greenblum & Bernstein, P.L.C.

[57] ABSTRACT

A branch image pickup and view system includes an objective lens system, an eyepiece lens system through which an image formed by the objective lens system is viewed, an image pickup surface which is adapted to pick up an image formed by the objective lens system, an optical separation system provided behind the objective lens system to split a bundle of light into a light bundle for the image pickup surface and a light bundle for the eyepiece lens system, an optical reduction system which is provided between the optical separation system and the image pickup surface, a condenser lens which is provided in the optical separation system to relay an image formed by the objective lens system to the eyepiece lens system, and an optical enlargement system which is provided between the optical separation system and the condenser lens.

14 Claims, 7 Drawing Sheets

—— d LINE
······ g LINE
--- C LINE

-0.5    0.5
SPHERICAL
ABERRATION

CHROMATIC
ABERRATION

FIG. 5B
B= 11.0

-0.2    0.2
TRANSVERSE
CHROMATIC
ABERRATION

-1.0    1.0
ASTIGMATISM

FIG. 5D
B= 11.0

-5.0    5.0 %
DISTORTION

— d LINE
······ g LINE
--- C LINE

-0.5  0.5
SPHERICAL
ABERRATION
CHROMATIC
ABERRATION

FIG. 9B
B= 11.2

-0.2  0.2
TRANSVERSE
CHROMATIC
ABERRATION

-1.0  1.0
ASTIGMATISM

FIG. 9D
B= 11.2

-5.0  5.0 %
DISTORTION

FIG. 13A 
SPHERICAL
ABERRATION
CHROMATIC
ABERRATION

FIG. 13B 
TRANSVERSE
CHROMATIC
ABERRATION

FIG. 13C 
ASTIGMATISM

FIG. 13D 
DISTORTION

BRANCH IMAGE PICKUP AND VIEW SYSTEM

BACKGROUND OF THE INVENTION

1. Field of the Invention

The present invention relates to a branch image pickup and view system having an optical image pickup system and a view finder system, for use with a CCD camera, such as a small video camera, a digital camera or an electronic still camera, etc.

2. Description of the Related Art

In recent CCD cameras, the picture plane size of the CCD as a light receiving element is reduced from ½" or ⅓" to ¼" or ⅕". Attempts have also been made to miniaturize CCD cameras. Moreover, the conventional CCD camera is usually provided with a liquid crystal (LC) finder and/or an optical view finder as a means for visually confirming images to be picked up. There are various types of optical view finders, such as a view finder independent from the optical image pickup system or a branch view finder bifurcated therefrom.

The LC finder has drawbacks such as that it consumes a large amount of electrical power, thus resulting in reduced service life of a battery to be used; the movement of the images displayed in the picture plane is discontinuous, and the resolution is lower than that of the optical. view finder.

In an optical view finder independent from the optical image pickup system, there is a difference (parallax) for an object which is located at an object distance other than a specific or reference object distance, between the photographing range of the image pickup system and the view range of the view finder.

The branch view finder bifurcated from the image pickup system has no parallax but has drawbacks such as that it is difficult to meet the requirements of miniaturization and ease of viewing through the finder. If the picture plane size of the image pickup system (CCD) is reduced to miniaturize the view finder, the picture plane size of the primary image forming surface is also reduced in the bifurcated light path of the optical view finder, and an apparent emission angle (angle of view) becomes small, so that the image to be viewed is made small, thus resulting in difficulty in observation through the finder.

If the focal length of the eyepiece is reduced to increase the apparent field of view, pupil diameter and eye relief are reduced, and hence a vignetting tends to occur even due to a slight movement of the eye, so that a clear image cannot be viewed through the view finder.

SUMMARY OF THE INVENTION

It is an object of the present invention to provide a bifurcated optical image pickup and view system having a small image pickup system and an optical view finder through which an image can be clearly viewed and which is bifurcated from the image pickup system.

To achieve the object mentioned above, according to the present invention, there is provided a branch image pickup and view system comprising an optical objective system, an optical eyepiece system through which an image formed by the optical objective system is viewed, an image pickup surface adapted to pick up an image formed by the optical objective system, an optical separation system provided behind the optical objective system to split a bundle of light into a light bundle for the image pickup surface and a light bundle for the optical eyepiece system, an optical reduction system which is provided between the optical separation system and the image pickup surface, a condenser lens which is provided in the optical path from the optical separation system-to the optical eyepiece system to relay an image formed by the optical objective system to the optical eyepiece system; and an optical enlargement system which is provided between the optical separation system and the condenser lens.

Preferably, the branch image pickup and view system satisfies the requirements defined by formulae (1) and (2) below;

$$0.5 < M_{R-i} < 1.0 \quad (1)$$

$$1.0 < M_{R-C} < 2.0 \quad (2)$$

wherein "$M_{R-i}$" represents lateral magnification of the optical reduction system, and "$M_{R-C}$" represents a resultant lateral magnification of the optical enlargement system and the condenser lens.

Preferably, the branch image pickup and view system satisfies the requirement defined by formula (3) below;

$$1.4 < M_{R-C}/M_{R-i} < 3.0 \quad (3)$$

In a preferred embodiment, the branch image pickup and view system satisfies the requirement defined by formula (4) below;

$$1.4 < M_R < 3.0 \quad (4)$$

wherein "$M_R$" represents a lateral magnification of the optical enlargement system.

The optical reduction system is preferably comprises a positive single lens element and a negative single lens element, It is further preferred that the optical reduction system satisfies the requirement defined by formula (5) below;

$$1.7 < N_P, \ 1.7 < N_N \quad (5)$$

wherein "$N_P$" represents a refractive index of the positive lens element, and "$N_N$" represents a refractive index of the negative lens element.

The branch image pickup and view system further comprises an optical image erection system that is provided between the optical objective system and the optical eyepiece system. The optical image erection system comprises an optical separation system, which comprises a beam splitter, and a prism having three reflection surfaces.

BRIEF DESCRIPTION OF THE DRAWINGS

The invention will be described below in detail with reference to the accompanying drawings, in which.

DESCRIPTION OF THE PREFERRED EMBODIMENTS

Figure 1A:
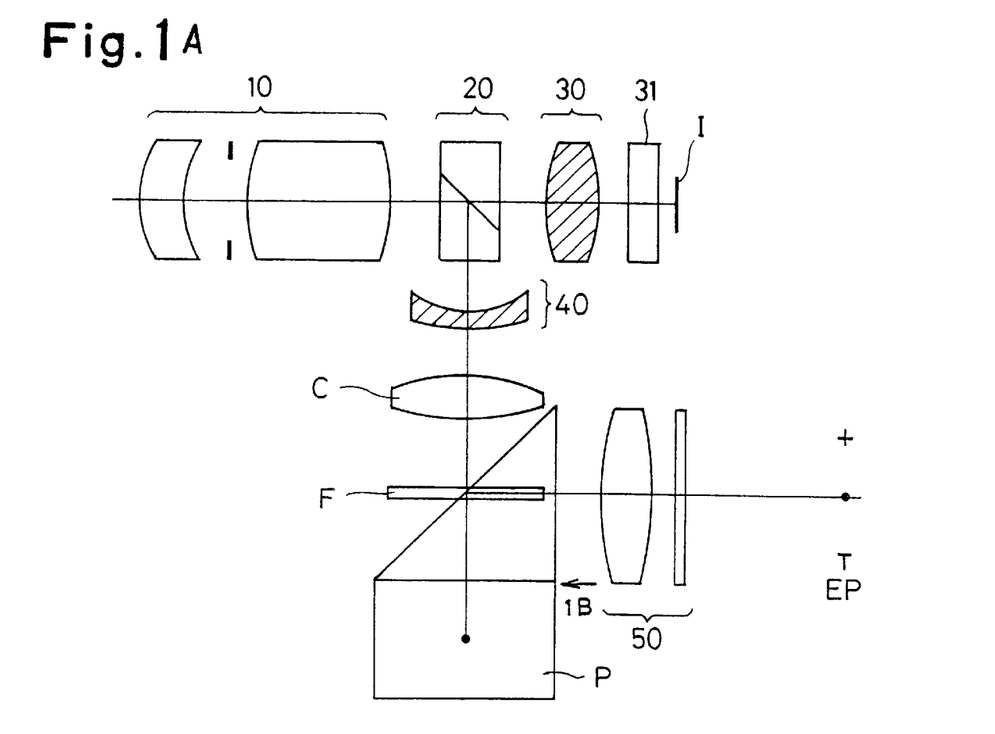
FIG. 1A is a schematic view of a branch image pickup and view system according to the present invention.
Figure 1B:
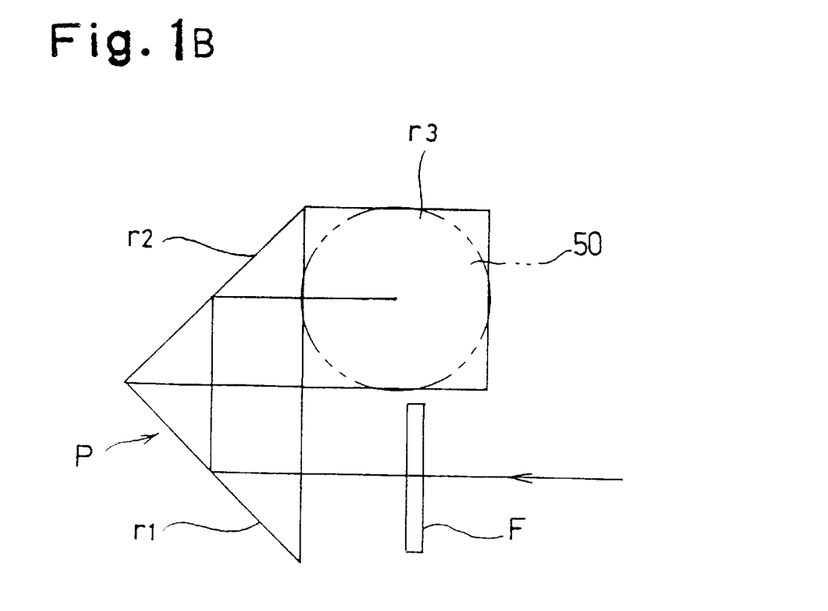
FIG. 1B is a view from an arrow 1B in FIG. 1A, which shows a prism and a field frame.

The branch image pickup and view system according to the present embodiment comprises an objective lens system 10, an optical separation system (beam splitter) 20, an optical reduction system 30 having positive power, and an image pickup surface I, in this order from the object side, as can be seen in FIG. 1A. An optical enlargement system 40 Lo having a negative power, a condenser lens C, a field frame F, a prism P having three reflection surfaces r1, r2 and r3, and an eyepiece lens system 50 are arranged in this order from the object side, in the branch light path bifurcated by the optical separation system 20. Four reflecting surfaces is consisting of the reflecting surface of the beam splitter 20 and the three reflection surfaces of the prism P comprises an optical erection system. "EP" designates the eye point. A glass cover 31 (which includes a filter) in the form of a flat plate is disposed in front of the image pickup surface I. In FIG. 1A, the optical reduction system 30 is represented by a positive single lens element. The optical enlargement system 40 is represented by a negative single lens element.

In the branch image pickup and view system, the image formed by the objective lens system 10 and the optical reduction system 30 is focused on the image pickup surface I. The image formed by the objective lens system 10, the optical enlargement system 40 and the condenser lens C is focused on the field frame F, which defines a primary image forming surface, so that the image can be viewed as an erect real image through the image erection system and the eyepiece lens system 50. In FIG. 1A, the optical reduction system 30 and the optical enlargement system 40 are represented by a positive single lens element and a negative single lens element, respectively.

According to one of the most significant features of the present embodiment, the optical reduction system 30 is provided between the optical separation system 20 (which located behind the objective lens system) 10 and the image pickup surface I, and the optical enlargement system 40 is provided between the optical separation system 20 and the condenser lens C which is adapted to relay the image to the eyepiece lens system 50. The optical reduction system 30 provided between the optical separation system 20 and the image pickup surface I makes the image pickup surface (CCD) I small and contributes to an enhancement of the efficiency of the optical system.

The optical enlargement system 40 provided between the optical separation system 20 and the condenser lens C contributes to an increase in the size of the primary image forming surface relative to the picture plane size of the objective lens system. Consequently, the focal length of the eyepiece lens system 50 can be increased, so that the apparent field of view, pupil diameter, and eye relief necessary for a normal optical view finder, can be obtained.

Thus, the objective lens system and the CCD can be made small, the efficiency of the image pickup system can be enhanced, the image can be easily and clearly viewed through the view finder, and the branch image pickup and view system can be miniaturized, thanks to the combination of the optical reduction system and the optical enlargement system.

Formula (1) specifies a lateral magnification of the optical reduction system. It is preferable that the lateral magnification of the optical reduction system satisfies formula (1). If the lateral magnification exceeds the upper limit of formula (1), the reduction system cannot be realized and hence the object of the present invention cannot be achieved. If the lateral magnification is smaller than the lower limit in the formula (1), the CCD can be made small, but the thickness of the lenses of the optical reduction system is increased.

Formula (2) specifies a resultant lateral magnification of the optical enlargement system and the condenser lens. It is preferable that the resultant lateral magnification satisfies formula (2). If the resultant lateral magnification exceeds the upper limit in formula (2), the apparent field of view and eye relief can be increased, but an aberration of the objective lens system is increased, and hence, a chromatic aberration and a curvature of a field of the optical view finder are also increased. If the resultant lateral magnification is smaller than the lower limit in formula (2), the enlargement system cannot be realized, and hence the object of the present invention cannot be achieved.

Note that condenser lens C, which is adapted to relay the image to the eyepiece lens system 50, has a positive power and a lateral magnification smaller than 1.0. Consequently, it is necessary for the lateral magnification $M_R$ of the optical enlargement system to satisfy formula (4) in order to satisfy formula (2).

It is preferable that the ratio between the lateral magnification of the optical reduction system and the resultant lateral magnification of the optical enlargement system and the condenser lens satisfies formula (3). If the ratio is smaller than the lower limit, it is difficult to easily view a clear image through the view finder without increasing the size of CCD. If the ratio is larger than the upper limit in the formula (3), the aberration of the optical view finder is increased.

If the optical reduction system having a positive power is comprised of at least one positive lens element and at least one negative lens element, chromatic aberrations can be corrected. Moreover, if the optical reduction system is made of highly refractive index glass which satisfies the requirement defined by formula (5) below, not only can the lens thickness of the optical reduction system be reduced, but also the curvature of the field can be effectively corrected.

$$1.7 < N_P, \ 1.7 < N_N \tag{5}$$

wherein $N_P$: refractive index of the positive lens element;
$N_N$: refractive index of the negative lens element.

If the optical enlargement system having a negative power is comprised of at least one negative meniscus lens element, of which the concave surface faces the object side, the curvature of the field can be effectively corrected.

Three examples of numerical data (Embodiments 1, 2 and 3) of a branch image pickup and view system according to the present invention will be discussed below.

Embodiment 1

Figure 2:
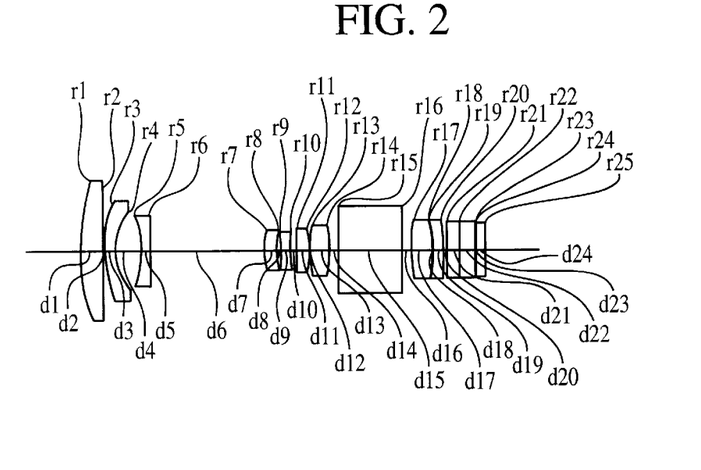
FIG. 2 is a conceptual view of a lens arrangement from an objective lens system to an image pickup surface, in a first embodiment of the present invention.
Figure 3A:
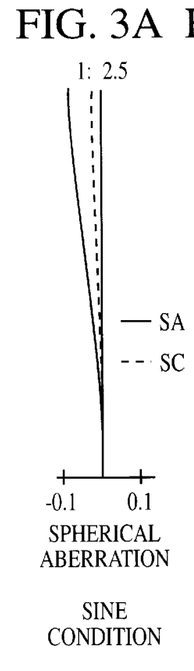
FIGS. 3A, 3B, 3C, 3D and 3E are aberration diagrams the lens system shown in FIG. 2.
Figures 3B, 3C, 3D:
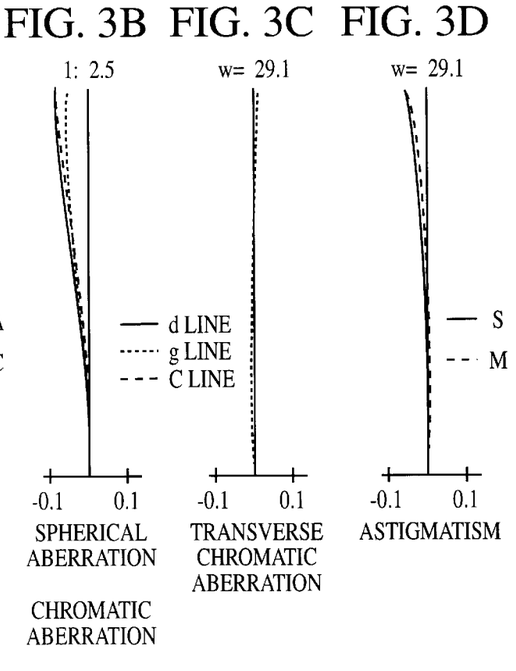
Figure 3E:
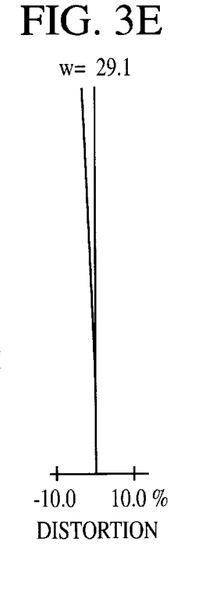
Figure 4:
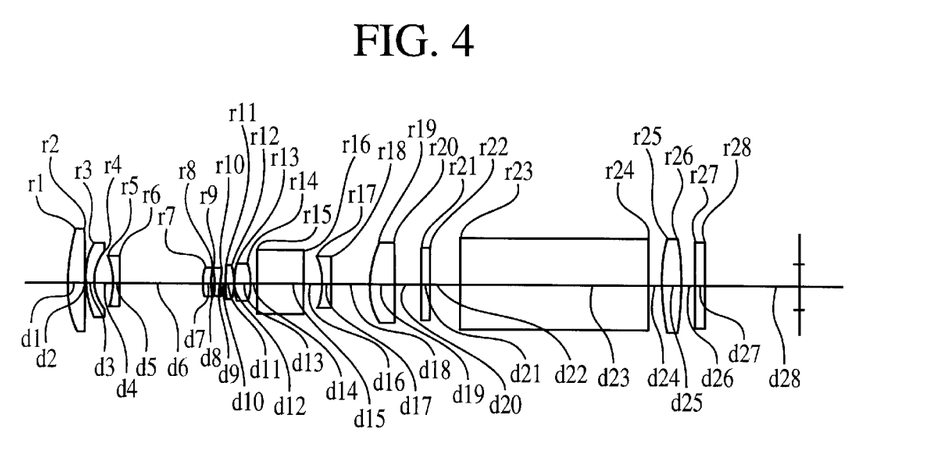
FIG. 4 is a conceptual view of a lens arrangement from an objective lens system to an eyepiece lens system, in a first embodiment of the present invention.
Figures 5A, 5B:
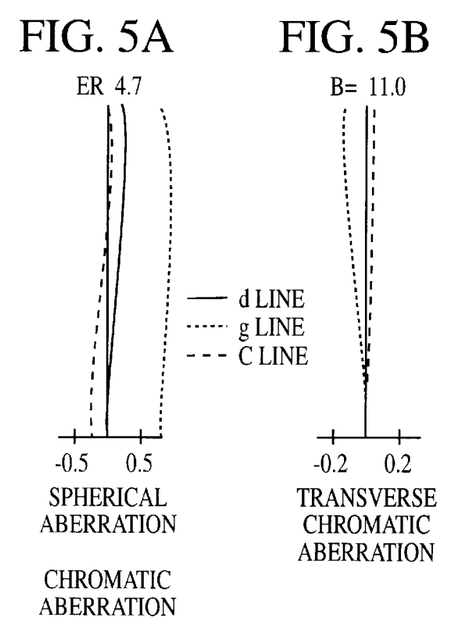
FIGS. 5A, 5B, 5C, and 5D are aberration diagrams of the lens system shown in FIG. 4.
Figure 5C:
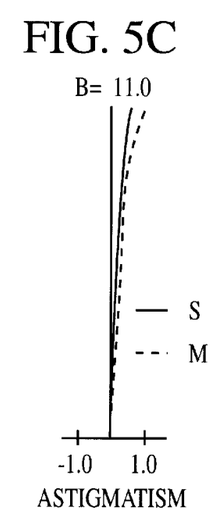
Figure 5D:
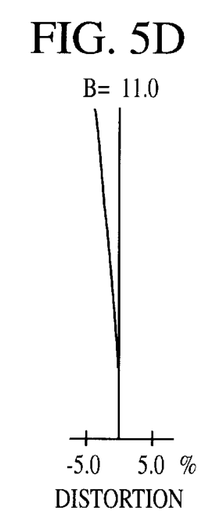

FIGS. 2 through 5 show a first embodiment of the present invention. FIG. 2 shows a lens arrangement of a lens system from the objective lens system 10 to the image pickup surface I, and FIGS. 3A through 3E show aberration diagrams thereof. FIG. 4 shows a lens arrangement of a lens system from the objective lens system 10 to the eyepiece lens system 50, and FIGS. 5A through 5D show aberration diagrams thereof. Tables 1 and 2 below show lens data of the lens system from the objective lens system 10 to the image pickup surface I, and lens data of the lens system from the beam separating optical element 20 to the eyepiece lens system 50, respectively.

In Table 2, no lens data of the lens surfaces Nos. 1 through 14 identical to those shown in Table 1 is shown. Lens surfaces Nos. 15 and 16 in Tables 1 and 2 correspond to the beam separating optical element 20. Lens surfaces Nos. 21 through 25 in Table 1 correspond to the glass cover of the image pickup surface (CCD). Lens surfaces Nos. 21 through 24 in Table 2 correspond to the planar plate of the field frame F and the prism P having three reflection surfaces, and lens surfaces Nos. 27 and 28 in Table 2 correspond to the glass cover of the eyepiece lens system 50, respectively.

In the aberration diagrams, "SA" designates a spherical aberration, "SC" a sine condition "d-line", "g-line" and "C-line" a chromatic aberration represented by the spherical aberration and lateral chromatic aberration at the respective wave lengths, "S" a sagittal rays, and "M" a meridional rays, respectively.

In the Tables and the drawings, "$F_{no}$" represents the F-number, "F" represents the focal length, "W" represents the half angle of view, "ER" represents the exit pupil diameter (eye ring), "B" represents the apparent field of view (half angle of view of emission angle), "$f_B$" represents the back focal distance, "$L_E$" represents the eye relief, "$f_{10}$, $f_{30}$, $f_{40}$, $f_C$, $f_{50}$" represent the focal lengths of the objective lens system 10, the optical reduction system 30, the optical enlargement system 40, the condenser lens C, and the eyepiece lens system 50, respectively, "R" represents the radius of curvature, "D" represents the lens thickness or the distance between the lenses, "$N_d$" represents the refractive index of the d-line, and "v" represents the Abbe number of the d-line, respectively. Tables 1 and 2 show lens data of the lens systems shown in FIG. 2 and FIG. 4, respectively.

TABLE 1

$F_{NO} = 1:2.5$
$F = 4.23$
$W = 29.1°$
$f_B = 1.19$
$f_{10} = 5.98$
$f_{30} = 20.77$

| Surface No. | R | D | $N_d$ | $v_d$ |
|---|---|---|---|---|
| 1 | 21.083 | 2.05 | 1.80518 | 25.4 |
| 2 | −300.000 | 0.10 | — | — |
| 3 | 11.634 | 1.00 | 1.80400 | 46.6 |
| 4 | 5.249 | 2.29 | — | — |
| 5 | −10.075 | 0.80 | 1.77250 | 49.6 |
| 6 | −496.238 | 10.45 | — | — |
| 7 | 5.637 | 1.20 | 1.72342 | 37.9 |

TABLE 1-continued

| 8 | 25.000 | 0.30 | — | — |
|---|---|---|---|---|
| 9 | −9.260 | 0.80 | 1.69895 | 30.1 |
| 10 | 7.040 | 0.64 | — | — |
| 11 | −57.150 | 1.10 | 1.65160 | 58.5 |
| 12 | −8.873 | 0.10 | — | — |
| 13 | 11.525 | 1.80 | 1.58913 | 61.2 |
| 14 | −9.471 | 0.80 | — | — |
| 15 | ∞ | 5.80 | 1.51633 | 64.1 |
| 16 | ∞ | 0.80 | — | — |
| 17 | 11.891 | 2.00 | 1.77250 | 49.6 |
| 18 | −11.891 | 0.11 | — | — |
| 19 | −9.471 | 0.80 | 1.84666 | 23.8 |
| 20 | 165.000 | 0.40 | — | — |
| 21 | ∞ | 1.20 | 1.51633 | 64.1 |
| 22 | ∞ | 1.37 | 1.49782 | 66.8 |
| 23 | ∞ | 0.10 | — | — |
| 24 | ∞ | 0.75 | 1.51633 | 64.1 |
| 25 | ∞ | — | — | — |

TABLE 2

$W = 29.1°$
$B = 11.0°$
$L_E = 12.0$
$ER = 4.7$
$f_{40} = -11.95$
$f_c = 13.93$
$f_{50} = 22.34$

| Surface No. | R | D | $N_d$ | $v_d$ |
|---|---|---|---|---|
| 15 | ∞ | 5.80 | 1.51633 | 64.1 |
| 16 | ∞ | 2.15 | — | — |
| 17 | −7.640 | 1.20 | 1.69680 | 55.5 |
| 18 | −99.000 | 4.77 | — | — |
| 19 | 11.614 | 3.00 | 1.83400 | 37.2 |
| 20 | ∞ | 3.50 | — | — |
| 21 | ∞ | 1.00 | 1.51633 | 64.1 |
| 22 | ∞ | 3.80 | — | — |
| 23 | ∞ | 23.50 | 1.49176 | 57.4 |
| 24 | ∞ | 1.50 | — | — |
| 25* | 19.320 | 2.60 | 1.49176 | 57.4 |
| 26 | −24.330 | 1.50 | — | — |
| 27 | ∞ | 1.20 | 1.49176 | 57.4 |
| 28 | ∞ | — | — | — |

* denotes a rotation symmetrical aspherical surface.

The rotation symmetrical aspherical surface can be generally expressed as follows:

$$x=Ch^2/\{1+[1-(1+K)C^2h^2]^{1/2}\}+A4h^4+A6h^6+A8h^8+ \ldots$$

wherein h represents a height above the axis, x represents a distance from a tangent plane of an aspherical vertex, C represents a curvature of the aspherical vertex (1/r), K represents a conic constant, A4 represents a fourth-order aspherical factor, A6 represents a sixth-order aspherical factor, A8 represents an eighth-order aspherical factor.

Aspherical Data

No.25; K=0,0, A4=−0.52000×10$^{-4}$, A6=−0.11300×10$^{-6}$
A8=0.0, A10=0.0, A12=0.0

Embodiment 2

Figure 6:
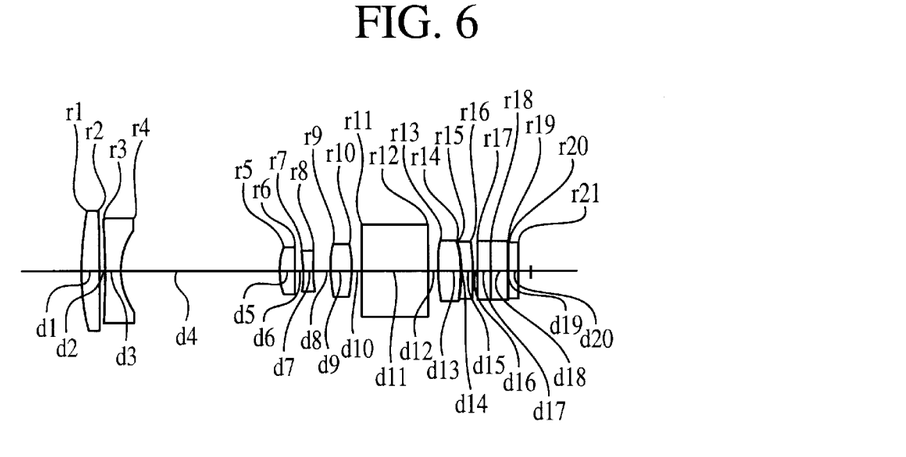
FIG. 6 is a conceptual view of a lens arrangement from an objective lens system to an image pickup surface, in a second embodiment of the present invention.
Figure 7A:
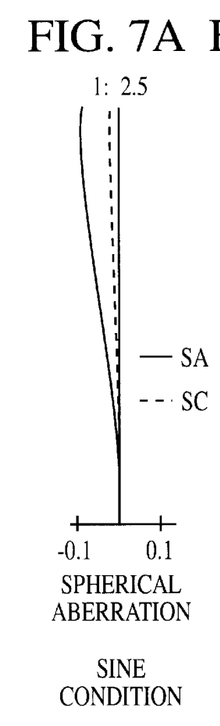
FIGS. 7A, 7B, 7C, 7D and 7E are aberration diagrams of the lens system shown in FIG. 6.
Figures 7B, 7C:
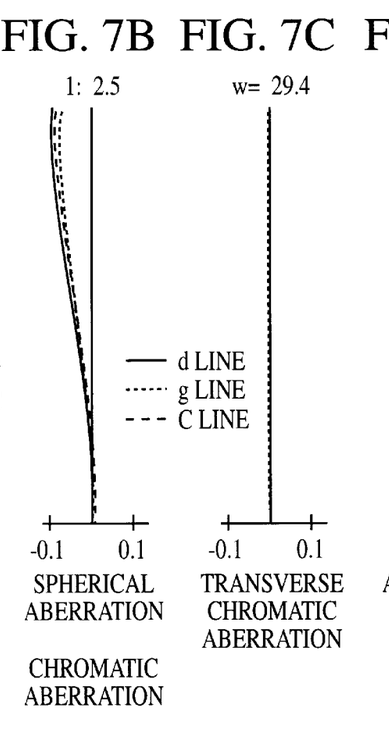
Figure 7D:
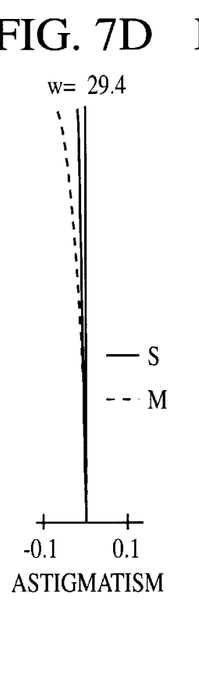
Figure 7E:
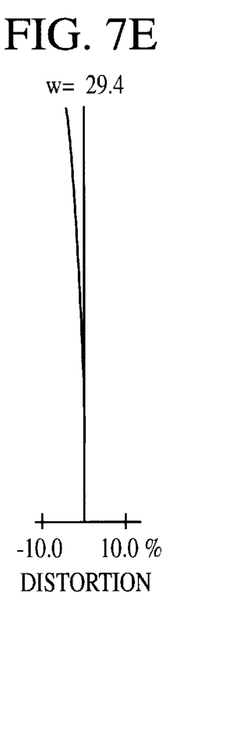
Figure 8:
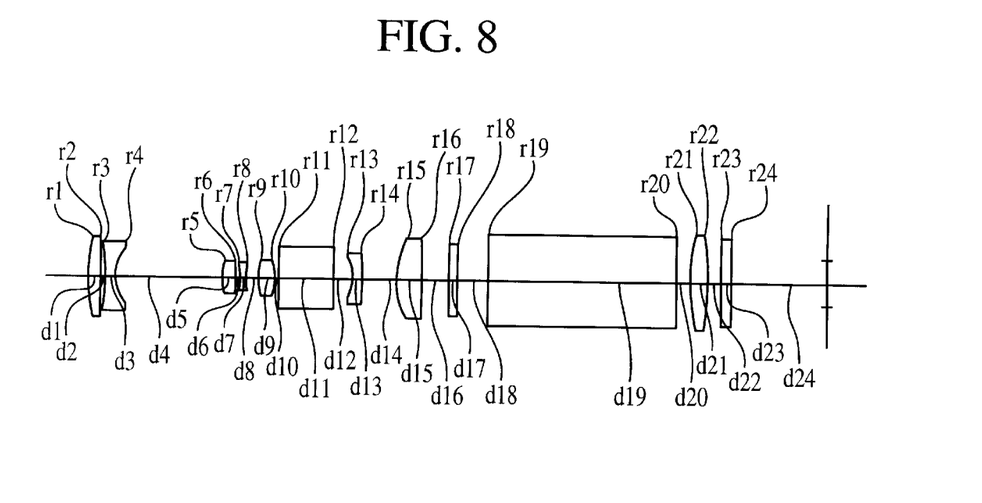
FIG. 8 is a conceptual view of a lens arrangement from an objective lens system to an eyepiece lens system, in second embodiment of the present invention.
Figures 9A, 9B:
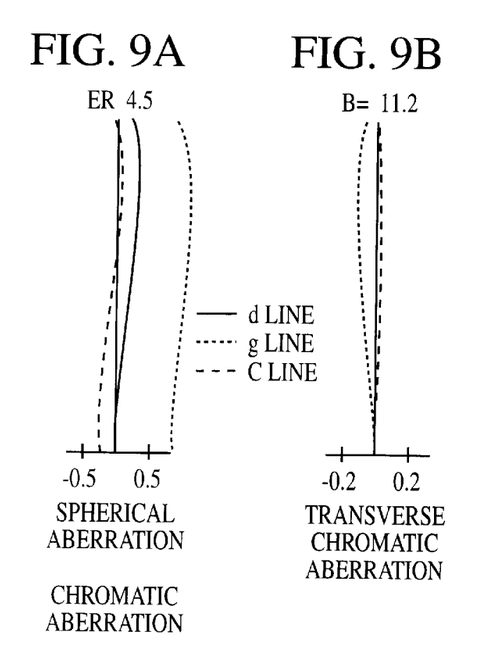
FIGS. 9A, 9B, 9C, and 9D are aberration diagrams of the lens system shown in FIG. 8.
Figure 9C:
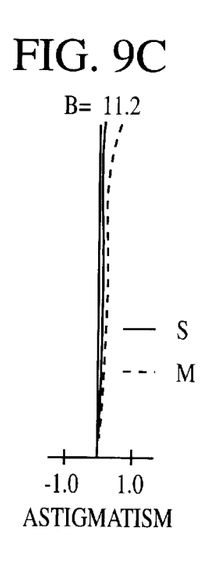
Figure 9D:
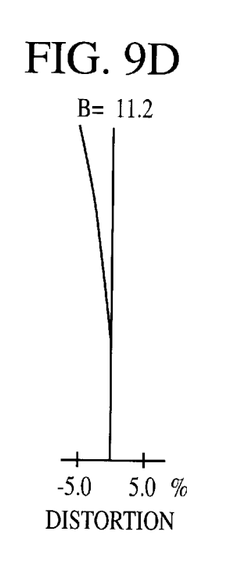

FIGS. 6 through 9 show a second embodiment of the present invention. FIG. 6 shows a lens arrangement of a lens system from the objective lens system 10 to the image pickup surface I, and FIGS. 7A through 7E show aberration diagrams thereof. FIG. 8 shows a lens arrangement of a lens system from the objective lens system 10 to the eyepiece lens system 50, and FIGS. 9A through 9D show aberration diagrams thereof. Tables 3 and 4 below show lens data of the lens system from the objective lens system 10 to the image pickup surface I, and lens data of the lens system from the objective lens system 10 to the eyepiece lens system 50, respectively.

In Table 4, no lens data of the lens surfaces Nos. 1 through 10 identical to those shown in Table 3 is shown. Lens surfaces Nos. 11 and 12 in Tables 3 and 4 correspond to the beam separating optical element 20. Lens surfaces Nos. 17 through 21 in Table 3 correspond to the glass cover of the image pickup surface (CCD). Lens surfaces Nos. 17 through 20 in Table 4 correspond to the planar plate of the field frame F and the prism P having three reflection surfaces, and lens surfaces Nos. 23 and 24 in Table 4 correspond to the glass cover of the eyepiece lens system 50, respectively.

TABLE 3

$F_{NO} = 1:2.5$
$F = 4.22$
$W = 29.4°$
$f_B = 1.19$
$f_{10} = 5.95$
$f_{30} = 22.73$

| Surface No. | R | D | $N_d$ | $\nu_d$ |
|---|---|---|---|---|
| 1 | 22.606 | 1.46 | 1.84666 | 23.8 |
| 2 | ∞ | 0.57 | — | — |
| 3 | −40.000 | 1.30 | 1.66910 | 55.4 |
| 4* | 5.000 | 13.24 | — | — |
| 5 | 6.123 | 1.50 | 1.80400 | 46.6 |
| 6 | −55.210 | 0.59 | — | — |
| 7 | −9.763 | 0.80 | 1.68893 | 31.1 |
| 8 | 5.000 | 1.54 | — | — |
| 9 | 11.190 | 1.80 | 1.72916 | 54.7 |
| 10 | −8.146 | 0.80 | — | — |
| 11 | ∞ | 5.60 | 1.51633 | 64.1 |
| 12 | ∞ | 0.79 | — | — |
| 13 | 11.050 | 2.00 | 1.77250 | 49.6 |
| 14 | −11.050 | 0.18 | — | — |
| 15 | −7.900 | 0.80 | 1.84666 | 23.8 |
| 16 | −128.179 | 0.40 | — | — |
| 17 | ∞ | 1.20 | 1.51633 | 64.1 |
| 18 | ∞ | 1.37 | 1.49782 | 66.8 |
| 19 | ∞ | 0.10 | — | — |
| 20 | ∞ | 0.75 | 1.51633 | 64.1 |
| 21 | ∞ | — | — | — |

Aspherical data

No. 4; $K = 0.0$, $A4 = -0.90000 \times 10^{-3}$, $A6 = 0.13400 \times 10^{-5}$
$A8 = 0.19900 \times 10^{-5}$, $A10 = 0.0$, $A12 = 0.0$

TABLE 4

$W = 29.4°$
$B = 11.2°$
$L_E = 12.0$
$ER = 4.5$
$f_{40} = -10.88$
$f_c = 13.63$
$f_{50} = 22.34$

| Surface No. | R | D | $N_d$ | $\nu_d$ |
|---|---|---|---|---|
| 11 | ∞ | 6.60 | 1.51633 | 64.1 |
| 12 | ∞ | 2.21 | — | — |
| 13 | −5.627 | 1.20 | 1.69680 | 55.5 |
| 14 | −23.765 | 4.36 | — | — |
| 15 | 11.368 | 3.00 | 1.83400 | 37.2 |
| 16 | ∞ | 3.50 | — | — |
| 17 | ∞ | 1.00 | 1.51633 | 64.1 |
| 18 | ∞ | 3.80 | — | — |
| 19 | ∞ | 23.50 | 1.49176 | 57.4 |
| 20 | ∞ | 1.50 | — | — |

TABLE 4-continued

| 21* | 19.320 | 2.60 | 1.49176 | 57.4 |
|---|---|---|---|---|
| 22 | −24.330 | 1.50 | — | — |
| 23 | ∞ | 1.20 | 1.49176 | 57.4 |
| 24 | ∞ | — | — | — |

Aspherical Data

No. 4: $K=0.0$, $A4=-0.90000\times10^{-3}$, $A6=-0.13400\times10^{-5}$
$A8=-0.19900\times10^{-5}$, $A10=0.0$, $A12=0.0$ No.21: $K=0.0$, $A4=-0.52000\times10^{-4}$, $A6=-0.11300\times10^{-6}$
$A8=0.00$, $A10=0.0$, $A12=0.0$ Embodiment 3

FIGS. 10 through 13 show a third embodiment of the present invention.

Figure 10:
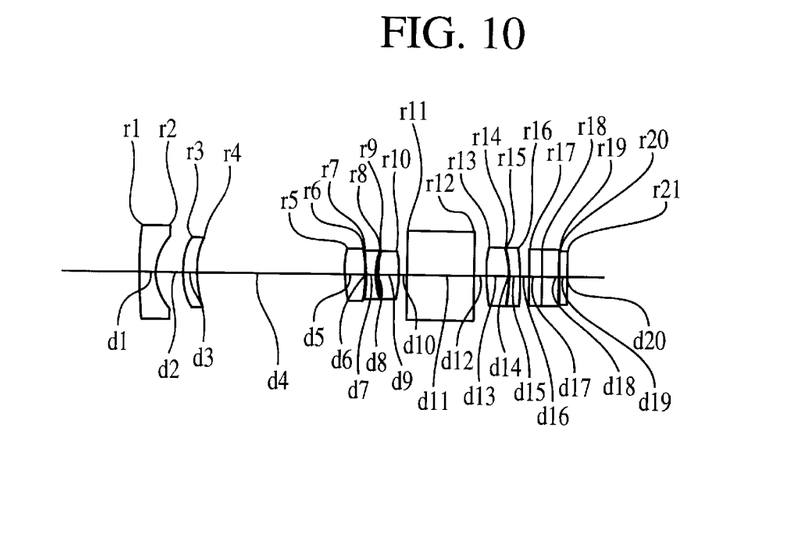
FIG. 10 is a conceptual view of a lens arrangement from an objective lens system to an image pickup surface, in a third embodiment of the present invention.
Figure 11A:
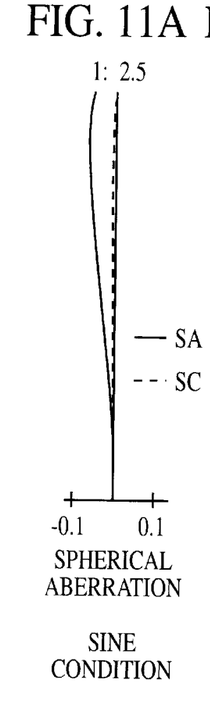
FIGS. 11A, 11B, 11C, 11D and 11E are aberration diagrams of the lens system shown in FIG. 10.
Figures 11B, 11C:
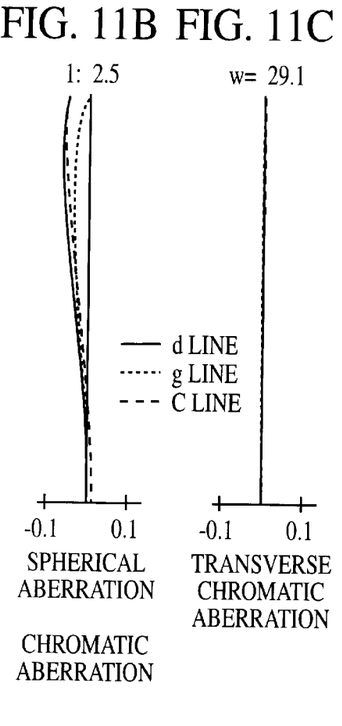
Figure 11D:
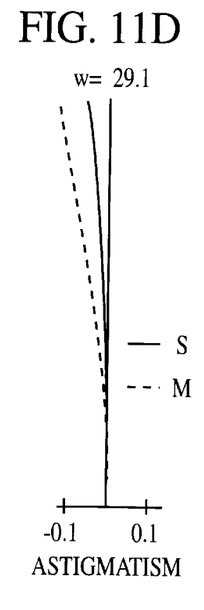
Figure 11E:
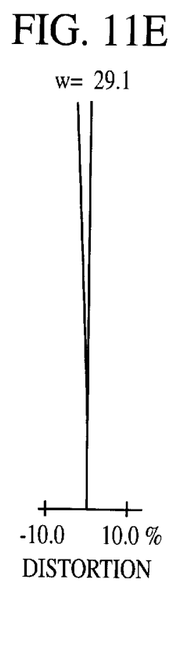
Figure 12:
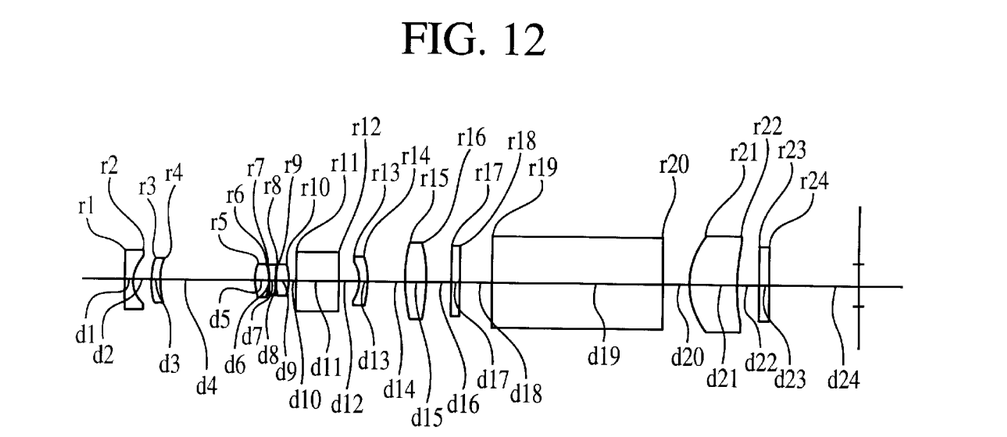
FIG. 12 is a conceptual view of a lens arrangement from an objective lens system to an eyepiece lens system, in a third embodiment of the present invention; and, FIGS. 13A, 13B, 13C, and 13D are aberration diagrams of the lens system shown in FIG. 12.
Figures 13A, 13B:
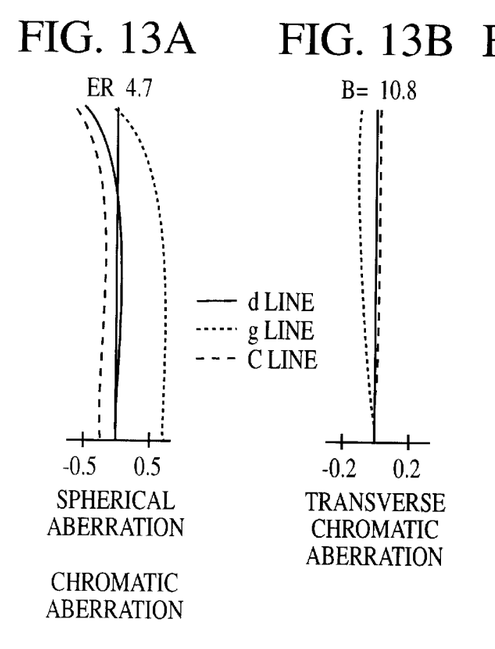
Figure 13C:
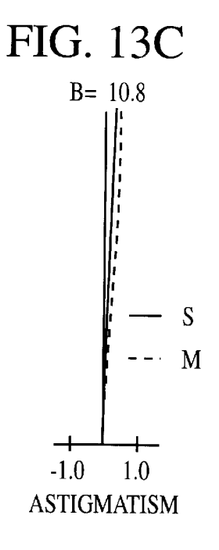
Figure 13D:
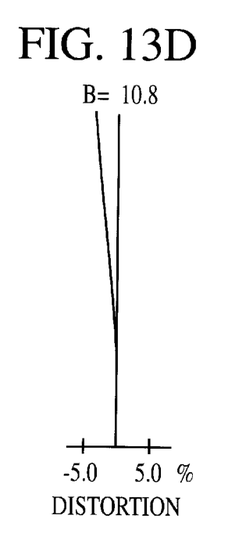

FIG. 10 shows a lens arrangement of a lens system from the objective lens system 10 to the image pickup surface I, and FIGS. 11A through 11E show aberration diagrams thereof. FIG. 12 shows a lens arrangement of a lens system from the objective lens system 10 to the eyepiece lens system 50, and FIGS. 13A through 13D show aberration diagrams thereof. Tables 5 and 6 below show lens data of the lens system from the objective lens system 10 to the image pickup surface I, and lens data of the lens system from the objective lens system 10 to the eyepiece lens system 50, respectively.

In Table 6, no lens data of the lens surfaces Nos. 1 through 10 identical to those shown in Table 5 is shown. Lens surfaces Nos. 11 and 12 in Tables 5 and 6 correspond to the beam separating optical element 20. Lens surfaces Nos. 17 through 21 in Table 5 correspond to the glass cover of the image pickup surface (CCD). Lens surfaces Nos. 17 through 20 in Table 6 correspond to the planar plate of the field frame F and the prism P having three reflection surfaces, and lens surfaces Nos. 23 and 24 in Table 6 correspond to the glass cover of the eyepiece lens system 50, respectively.

TABLE 5

$F_{NO} = 1:2.5$
$F = 4.27$
$W = 29.1°$
$f_B = 1.20$
$f_{10} = 6.06$
$f_{30} = 22.06$

| Surface No. | R | D | $N_d$ | $\nu_d$ |
|---|---|---|---|---|
| 1* | 100.000 | 1.30 | 1.66625 | 55.2 |
| 2 | 4.624 | 2.33 | — | — |
| 3 | 6.700 | 1.20 | 1.78472 | 25.7 |
| 4 | 8.580 | 12.64 | — | — |
| 5 | 6.818 | 1.75 | 1.80400 | 46.6 |
| 6 | −117.780 | 0.20 | — | — |
| 7 | −13.700 | 0.80 | 1.68893 | 31.1 |
| 8 | 6.080 | 0.26 | — | — |
| 9 | 11.166 | 1.70 | 1.77250 | 49.6 |
| 10 | −11.166 | 0.80 | — | — |
| 11 | ∞ | 5.60 | 1.51633 | 64.1 |
| 12 | ∞ | 0.99 | — | — |
| 13 | 11.306 | 2.17 | 1.72916 | 54.7 |
| 14 | −11.306 | 0.08 | — | — |
| 15 | −9.680 | 0.80 | 1.84666 | 23.8 |
| 16 | ∞ | 0.70 | — | — |
| 17 | ∞ | 1.20 | 1.51633 | 64.1 |
| 18 | ∞ | 1.37 | 1.49782 | 66.8 |
| 19 | ∞ | 0.10 | — | — |
| 20 | ∞ | 0.75 | 1.51633 | 64.1 |
| 21 | ∞ | — | — | — |

TABLE 5-continued

Asphericla data

No. 1: K = 0.0, A4 = 0.49100 × 10⁻³, A6 = 0.0
A8 = −0.72000 × 10⁻⁷, A10 = 0.0, A12 = 0.0

TABLE 6

W = 29.1°
B = 10.8°
$L_E$ = 12.0
ER = 4.7
$f_{40}$ = −12.35
$f_C$ = 14.25
$f_{50}$ = 23.74

| Surface No. | R | D | $N_d$ | $v_d$ |
|---|---|---|---|---|
| 11 | ∞ | 6.60 | 1.51633 | 64.1 |
| 12 | ∞ | 2.80 | — | — |
| 13 | −5.830 | 1.20 | 1.83481 | 42.7 |
| 14 | −14.677 | 4.84 | — | — |
| 15 | 23.065 | 3.00 | 1.83400 | 37.2 |
| 16 | −23.065 | 3.50 | — | — |
| 17 | ∞ | 1.00 | 1.51633 | 64.1 |
| 18 | ∞ | 4.30 | — | — |
| 19 | ∞ | 23.50 | 1.49176 | 57.4 |
| 20 | ∞ | 3.50 | — | — |
| 21* | 10.937 | 6.50 | 1.49176 | 57.4 |
| 22* | 139.719 | 3.00 | — | — |
| 23 | ∞ | 1.20 | 1.49176 | 57.4 |
| 24 | ∞ | — | — | — |

Aspherical data
No. 21: K = 0.0, A4 = 0.56200 × 10⁻⁴, A6 = 0.17900 × 10⁻⁵
A8 = 0.0, A10 = 0.0, A12 = 0.0
No. 22: K = 0.0, A4 = 0.23000 × 10⁻³, A6 = 0.56400 × 10⁻⁵
A8 = 0.0, A10= 0.0, A12 = 0.0

Table 7 shows numerical values corresponding to formulae (1) through (4) in the first, second and third embodiments.

TABLE 7

|  | Embodiment 1 | Embodiment 2 | Embodiment 3 |
|---|---|---|---|
| Formula (1) | 0.71 | 0.71 | 0.70 |
| Formula (2) | 1.34 | 1.39 | 1.41 |
| Formula (3) | 1.89 | 1.96 | 2.01 |
| Formula (4) | 2.30 | 2.42 | 2.18 |

Also, the aberrations can be appropriately corrected.

As may be understood from the above discussion, according to the present invention, in a camera having an optical view finder bifurcated from the light path of the optical image pickup system, a branch image pickup and view system in which the image can be clearly viewed through the optical view finder without increasing the size of the optical image pickup system can be obtained.

What is claimed is:

1. A branch image pickup and view system, comprising:
an optical objective system;
an optical eyepiece system through which an image formed by said optical objective system is viewed;
an image pickup surface adapted to pick up an image formed by said optical objective system;
an optical separation system provided behind said optical objective system to split a bundle of light into a first light bundle for said image pickup surface and a second light bundle for said optical eyepiece system;
an optical reduction system provided between said optical separation system and said image pickup surface;
a condenser lens provided in an optical path from said optical separation system to said optical eyepiece system to relay an image formed by said optical objective system to said optical eyepiece system; and
an optical enlargement system provided between said optical separation system and said condenser lens,
wherein the following relationships are satisfied:

$0.5 < M_{R-I} < 1.0$, and $1.0 < M_{R-C} < 2.0$, wherein "$M_{R-I}$" represents a lateral magnification of said optical reduction system; and
"$M_{R-C}$" represents a resultant lateral magnification of said optical enlargement system and said condenser lens.

2. A branch image pickup and view system according to claim 1, wherein said system satisfies the following:

$1.4 < M_R < 3.0$, wherein "$M_R$" represents a lateral magnification of said optical enlargement system.

3. A branch image pickup and view system according to claim 1, wherein said optical reduction system comprises a positive single lens element and a negative single lens element.

4. A branch image pickup and view system according to claim 3, wherein said system satisfies the following:

$1.7 < N_P, 1.7 < N_N,$ wherein
$N_P$ represents a refractive index of said positive lens element; and
$N_N$ represents a refractive index of said negative lens element.

5. A branch image pickup and view system according to claim 1, further comprising an optical image erection system provided between said optical objective system and said optical eyepiece system.

6. A branch image pickup and view system according to claim 5, wherein said optical image erection system comprises said optical separation system and a prism having three reflection surfaces.

7. A branch image pickup and view system according to claim 1, wherein said optical separation system comprises a beam splitter.

8. A branch image pickup and view system comprising:
an optical objective system;
an optical eyepiece system through which an image formed by said optical objective system is viewed;
an image pickup surface adapted to pick up an image formed by said optical objective system;
an optical separation system provided behind said optical objective system to split a bundle of light into a first light bundle for said image pickup surface and a second light bundle for said optical eyepiece system;
an optical reduction system provided between said optical separation system and said image pickup surface;
a condenser lens provided in an optical path from said optical separation system to said optical eyepiece system to relay an image formed by said optical objective system to said optical eyepiece system; and
an optical enlargement system provided between said optical separation system and said condenser lens, wherein said system satisfies the following relationship is satisfied:

$$1.4 < M_{R-C}/M_{R-I} < 3.0,$$

wherein "$M_{R-C}$" represents a resultant lateral magnification of said optical enlargement system and said condenser lens, and "$M_{R-I}$" represents a lateral magnification of said optical reduction system.

9. The branch image pickup and view system according to claim 8, wherein said system satisfies the following relationship:

$$1.4 < M_R < 3.0,$$

wherein "$M_R$" represents a lateral magnification of said optical enlargement system.

10. The branch pickup and view system according to claim 8, wherein said optical reduction system comprises a positive single lens element and a negative single lens element.

11. The branch image pickup and view system according to claim 10, wherein said system satisfies the following relationship:

$$1.7 < N_P, \ 1.7 < N_N,$$

wherein
  $N_P$ represents a refractive index of said positive lens element; and
  $N_N$ represents a refractive index of said negative lens element.

12. The branch image pickup and view system according to claim 8, further comprising an optical image erection system provided between said optical objective system and said optical eyepiece system.

13. The branch image pickup and view system according to claim 12, wherein said optical image erection system comprises said optical separation system and a prism having three reflection surfaces.

14. The branch image pickup and view system according to claim 8, wherein said optical separation system comprises a beam splitter.

* * * * *